United States Patent
Rouault

(10) Patent No.: US 6,707,003 B2
(45) Date of Patent: Mar. 16, 2004

(54) METHOD AND SYSTEM FOR SOLVING A PROBLEM ARISING DURING A WELDING OPERATION OR THE LIKE

(75) Inventor: Philippe Rouault, Poissy (FR)

(73) Assignee: L'Air Liquide - Societe Anonyme a Directoire et Conseil de Surveillance pour l Etude et l'Exploitation des Procedes Georges Claude, Paris Cedex (FR)

( * ) Notice: Subject to any disclaimer, the term of this patent is extended or adjusted under 35 U.S.C. 154(b) by 45 days.

(21) Appl. No.: 10/006,664

(22) Filed: Dec. 10, 2001

(65) Prior Publication Data

US 2002/0088786 A1 Jul. 11, 2002

(30) Foreign Application Priority Data

Dec. 8, 2000 (EP) .............................................. 00403450

(51) Int. Cl.$^7$ ................................................ B23K 9/10
(52) U.S. Cl. ................................... 219/137 R; 219/136
(58) Field of Search ........................... 219/130.01, 136, 219/137 R; 345/961; 700/182; 702/184; 706/47

(56) References Cited

U.S. PATENT DOCUMENTS

| 4,697,239 A | * | 9/1987 | Sicard et al. ............... 700/182 |
| 5,111,426 A | * | 5/1992 | Bergstresser, Sr. et al. . 345/961 |
| 5,353,238 A | * | 10/1994 | Neef et al. .................. 702/184 |

* cited by examiner

Primary Examiner—Clifford C. Shaw
(74) Attorney, Agent, or Firm—Young & Thompson

(57) ABSTRACT

A method and a system for diagnosing and/or solving, in particular remotely, a given technical problem likely to arise before, during or after a heat treatment operation on metals, in particular in the welding or cutting field, and to provide the most suitable solution thereto, and to do so by minimizing the time needed to solve this problem and therefore by reducing the loss of productivity likely to occur because of this technical problem.

14 Claims, 2 Drawing Sheets

METHOD AND SYSTEM FOR SOLVING A PROBLEM ARISING DURING A WELDING OPERATION OR THE LIKE

BACKGROUND OF THE INVENTION

The invention relates to a method and a system for diagnosing and/or solving, in particular remotely, a given technical problem likely to arise before, during or after a heat treatment operation on metals, in particular in the welding field.

DESCRIPTION OF THE RELATED ART

To make the invention easier to understand, the term "welding field" is used in its generic sense and therefore covers, within the context of the invention, actual welding processes, such as MIG (Metal Inert Gas), MAG (Metal Active Gas), TIG (Tungsten Inert Gas), plasma, submerged-arc or electrode welding, but also similar or related metal heat treatment processes, such as cutting processes, especially oxycutting or plasma-arc, laser-beam or electron-beam cutting; thermal marking processes, especially plasma or laser marking; and thermal spraying, especially plasma-arc spraying.

At the present time, the technical knowledge in the welding field is disseminated in many published documents, in general by specialist institutions, such as the AWS (American Welding Society), ASM (American Society for Metals) and the TWI (The Welding Institute).

Although this literature is generally complete and can answer many questions that welding practitioners may pose, it does have the drawback, however, of being incorporated into reference works ranging from a few hundred to several thousands of pages.

Consequently, it may be readily understood that, given the volume that these reference works represent, it is often very difficult to quickly find therein a solution to a given technical problem arising either during a welding operation, or before or after such an operation.

Moreover, the structure of the information is in conventional reference works of the "literature" type, that is to say that information given in a chapter of the reference work or document consulted is in general only developed completely once in one part of that reference work, bibliographic references being used in the other chapters.

This has the advantage of not burdening the reference works but often requires the reader to consult, at best, several chapters or, at worst, several different reference works or documents in order to obtain complete information about one particular subject.

It may be readily understood that this current procedure makes the search for a quick and effective solution to the technical problem arising in the welding field even more difficult, or even does not always allow such a solution to be found.

In parallel with this observation, the development of information technology, especially with tools such as hypertext links and Internet or Intranet networks, makes it possible to link together extremely large bodies of information and above all to facilitate access thereto.

However, the great majority of tools for these networks are constructed in a manner very similar to that described for technical documentation of the reference work type, that is to say they are constructed in a document management mode.

Consequently, although a person searching for information admittedly has the possibility of rapidly consulting a very large number of documents, insofar as they are referenced, he must, however, here again extract from them the particular information of interest to him.

This results in often expensive and not very effective on-line navigation for someone searching quickly for a particular technical solution to a precise problem that has arisen.

In other words, a welding operator having to very quickly find some given technical information allowing him to solve a technical welding problem that has arisen in a workshop, in a factory or on another site often far from the information source, is presently confronted with another technical problem, namely that of the effectiveness in the search for the information or technical solution that can be applied to solve his welding or similar problem as quickly as possible.

Put another way, the problem that arises is to be able to find, quickly and effectively, the most appropriate technical solution or answer to the precise technical question that has arisen and to do so, in particular directly on the site where he is carrying out his welding operation, so as to reduce as far as possible the time wasted in searching for this information and therefore to decrease the loss of productivity associated, for example, with momentarily stopping the welding or similar process in which the given technical problem has arisen.

SUMMARY OF THE INVENTION

It is an object of the present invention therefore to provide a method of making it easier for a welding operator to solve a given technical problem and to find thereby a solution or the most appropriate solution and to do so while minimizing the time needed to solve this problem and therefore by reducing the loss of productivity likely to occur because of this technical problem.

The invention therefore relates to a method for diagnosing and/or solving, in particular remotely, a technical problem likely to arise before, during or after the operation of a heat treatment process, comprising the steps of:

(a) indication and/or selection by the user of a type of heat treatment process implemented or to be implemented;

(b) indication and/or selection by the user of at least one type of technical problem to be solved arising or likely to arise during implementation of the type of heat treatment process of step (a);

(c) indication and/or selection by the user of at least one parameter, preferably several parameters, relating to the configuration of the said heat treatment process of step (a);

(d) processing of at least some of the indications or selections made by the user in steps (a), (b) and (c);

(e) proposal to the user of at least some information relating to at least one modification or at least one adjustment to be made to at least one configuration parameter of the said heat treatment process so as to solve, at least partly, the type of technical problem of step (b).

According to another aspect, the invention also relates to a method for determining, setting, adjusting and/or modifying at least one parameter of a heat treatment process, before or during implementation of the said heat treatment process by a user, comprising the steps of:

(a') indication and/or selection by the user of a type of heat treatment process implemented or to be implemented;

(b') indication and/or selection by the user of at least one parameter relating to the configuration of the said heat treatment process, that has to be or is likely to be adjusted, modified or set, before or during implementation of the heat treatment process of step (a');

(c') processing of at least some of the indications or selections made by the user in steps (a') and (b');

(d') proposal to the user of at least some information relating to at least one modification or at least one setting to be made of at least the said configuration parameter of the said heat treatment process.

Depending on the case, the method of the invention may comprise one or more of the following features:

it includes the additional step (f) of displaying, storing, printing, transmitting, interpreting and/or exporting at least some information obtained in step (e) or in step (d');

it includes the additional step (g) of modifying or setting at least one configuration parameter, preferably several configuration parameters, of the said heat treatment process according to at least some information obtained in step (e) or in step (d');

in step (a) or (a'), the type of heat treatment process implemented or to be implemented is chosen or selected from the group formed by cutting processes, welding processes, marking processes, heat spraying processes and combinations thereof;

in steps (a), (b) and/or (c) or (a') and/or (b'), the indication or the selection is made by the user via data or information acquisition and/or selection means, for example the data acquisition and/or selection means may comprise a computer keyboard or the like, a mouse, a voice recognition system, a portable or non-portable telephone, for example a portable telephone equipped with a WAP™ system, a personal organizer, such as the devices of this type sold by the companies Palm™, Ericsson™ or Siemens™, a computer, a data transmission network, such as the Internet network, or an internal network, such as an Intranet network, a monitor or a tactile touch control screen, etc.;

in step (f), the display is made on a "touch" screen, especially a computer screen, a telephone screen, a personal organizer screen, a watch screen or any similar or analogous display screen having a size and/or a graphics resolution sufficient to allow it to be read, directly or indirectly, by a user;

in step (b) or (b'), the type of technical problem to be solved is a problem relating to:
the choice of consumables (filler wires, shielding gases, electrodes, etc.), the parameters of the process (voltage, wire speed, welding speed, etc.), the setting of a piece of equipment or of a fitting (distance between contact tip and sheet to be welded, and/or inclination of the welding torch, etc.);
health or safety, for example reduction of smoke emission, noise and electrical risks, protection against thermal radiation, etc.;
malfunction of a piece of equipment or a fitting, such as poor unspooling of the filler wire in GMAW, a gas shielding problem in GTAW, GMAW or PAW welding, fouling or wear of the fitting, such as the contact tips, the wire guides, etc.;
the productivity of the process, especially increasing the speed of welding or cutting of materials, increasing the hourly rate of deposition of weld metal, reducing the finishing work, etc.;
the quality of the work produced, such as reduction or elimination of porosity, undercuts or excessively convex weld beads in welding, or the reduction of flash or of oxidation of the cut faces in cutting, etc.;

in step (c) or (b'), at least one configuration parameter of the said heat treatment process is chosen from the voltage, the current, the feed rate of the filler wire, the speed of advance (or welding speed), the nature of the filler wire or electrode, the nature of the shielding gas, its flow rate and its quality, the choice of solid flux associated with the wire in submerged-arc welding, the orientation and position of the welding torch with respect to the weld to be produced, the preparation and the thickness of the workpieces to be joined together or, in the case of cutting, the cutting speed and the gas used;

in step (d) or (c'), the processing of the indications or selections made by the user comprises:
(i) a comparison of the said indications or selections with reference information stored in at least one database,
(ii) a proposal of at least one possible solution, preferably an optimized solution and/or a solution better than that entered by the user, of an explanation and/or of an answer to a question raised, stored in at least one database;

it incorporates a module for the automatic acquisition of the welding parameters (such as the current, the voltage, the welding speed, etc.) and for the transmission to a screen, computer monitor, liquid-crystal screen, etc., and which allows the user to question the system as mentioned above.

According to another aspect, the invention also relates to a system for diagnosing and/or solving, in particular remotely, a technical problem likely to arise before, during or after implementation of a heat treatment process, comprising:

(a) information acquisition and/or selection means allowing a user to indicate and/or select:
(i) a type of heat treatment process implemented or to be implemented,
(ii) at least one type of technical problem to be solved that has arisen or is likely to arise during implementation of the type of heat treatment process and
(ii) at least one parameter, preferably several parameters, relating to the configuration of the said heat treatment process.

(b) information processing means for processing at least some of the indications and/or selections made by the user with the aid of the information acquisition and/or selection means;

(c) information delivery means for displaying, storing, printing, transmitting, interpreting and/or exporting at least one piece of information relating to at least one modification and/or at least one setting to be made of at least one configuration parameter of the said heat treatment process so as to solve, at least partly, the said technical problem.

Depending on the case, the system of the invention may comprise one or more of the following features:

it comprises at least one user station which may be a portable or fixed computer, which includes a central processing unit itself comprising a microprocessor, a RAM or ROM memory unit and a hard disk, which also has a storage function, all these elements being coupled to a network card or a modem. A screen allows the information proposed by the invention to be displayed. The system furthermore comprises peripherals, such as a computer keyboard or a mouse. other hypertext-type file or line selection means may be used, for example a touchscreen or a voice recognition system. The user station may also be a terminal linked directly to an Internet server or to a central operating system. It may also be a personal organizer, a telephone screen or a watch screen. All these systems are linked to a central server holding at least one database containing the knowledge necessary for solving the problems arising in heat treatment processes, processing software, such as the NTK Surf™ software from the company Némesia™, a WEB server or, in the case of portable stations not connected to a network, a CD-ROM reader on which the database information is located;

the link between the user station and the central server comprises a remote communication network or line, especially the Internet network;

it includes data transmission means allowing the choices or selections made by the user by means of the information acquisition and/or selection means to be transmitted to the said central server.

In other words, the invention is schematically designed around two main concepts:

one relating to the quick and effective search for a suitable solution to a given technical problem arising during, before or after a welding or similar operation, this search being carried out, in particular remotely, using the modern communication networks, especially the Internet network, and not requiring the inconvenient handling of reference works;

the other relating to the application of this solution to the given technical problem, that is to say the practical and technical implementation of this solution from an industrial viewpoint so as to solve this problem and to be able to continue the welding or similar process which, for example, had been stopped because of the problems that had arisen.

To achieve this, according to the invention, the information to be searched is organized and subdivided in terms of areas of knowledge, of situations encountered and of corrective actions to be taken, which are stored in suitable storage media and can be easily retrieved through interrogation by the operator, that is to say by using the technical information entered by the operator, such as the nature of the metal to be treated, the type of process chosen, the gases used, the characteristics of the current source used, etc.

By virtue of the invention it is no longer a question, as is the case in the prior art, of having to consult many various chapters, sub-chapters, paragraphs or documents which have to be analyzed before being able to find a solution to the problem that has arisen.

This is because the invention is based especially on the use and the organization of elements of welding knowledge linked together via, for example, hypertext links or the like.

The following example of a GMAW (Gas Metal Arc Welding) process, given purely by way of illustration but implying no limitation, will allow the invention to be more clearly understood.

In a conventional approach for transmitting technical information relating to the GMAW welding process, the structure of a document or of a reference work dealing with this process is generally the following:

general presentation of the process;

modes of metal transfer in the arc: dip or short-circuit, globular, axial streaming, spray, etc.;

the welding generators that can be used by this process;

the welding fittings that can be used: torches, feeders, etc.;

the welding consumables that can be used: filler wires, shielding gases, etc.;

the materials that can be welded;

the particular applications; and the problems encountered with given solutions.

This list is not exhaustive and the order of the information may vary from one reference work or document to another.

In contrast, the structure according to the invention only involves elements of knowledge, that is to say the information is no longer initially structured as above.

Thus, that which constituted a "fittings" chapter becomes a group of entirely separate objects, such as the various types of feeders, welding torches, contact tips, etc.

Next, according to the invention, the information is structured by hypertext links whereas, in a conventional presentation, a subject is treated only once and is mentioned in related parts; the object-oriented structure according to the invention makes it possible to link one element to other related elements as many times as desired.

The same applies to what has been defined as a welding situation.

Although it is usually dealt with in a unique manner and mentioned by documentary reference in the other parts of the technical documents, segmentation by knowledge element according to the invention makes it possible to place a situation at the node of a network which would be linked to the many situations that may be the cause of it. This is because, in welding a situation is really univocal, that is to say it is generally the result of several possible causes.

Likewise, a corrective action may be common to several situations and above all may modify parameters which could not be taken into account initially by the person consulting the knowledge tool.

Segmentation by objects linked by hypertext links makes it possible to remind the user of these secondary effects of a corrective action.

Once the knowledge elements have been created, the whole system must of course be given a structure.

The basic concept is to answer precise questions posed by users and to give the right information desired at the right moment, that is to say to provide a solution that can be applied immediately to the welding process in which the problem has arisen. To do this the structure of the information is designed around that of a welding operation.

It is no longer a question of giving academic information, like that described above, but of locating it within the chronological order of a manufacturing welding process. This order makes it possible to give a response depending on the step performed in the execution of the welding operation, but that, in an ideal situation, the information given would obviously be more useful if it were known prior to any welding or similar action being carried out, so as to avoid problems likely to arise during it.

It is therefore segmented in terms of information that a welding practitioner would be able to search:

either during preparation of the welding operations, for example the selection of consumables or welding gases to be used to weld or cut such and such a metal or metal alloy;

or during implementation of the welding, for example the search for ways of reducing welding noise, the solution to malfunctions of the welding sets or the search for parameters for a given configuration;

or after welding, for example solutions to quality or repair problems or even seeking ways of increasing the productivity of the process.

The object-oriented decomposition makes it possible to link together information usually separated into various files, reference works or documents.

It is thus possible, by combining the welding knowledge with the means given by the hypertext links, to construct a product selection guide module which includes the grade to be welded and the consumables or pairs of welding products to be used.

One example that may be given, by way of illustration but implying no limitation, is that of the GMAW welding of steels whose yield strength is between 185 and 420 MPa.

In this case, after selection by broad category of grades, such as steels, nickel bases, etc., the user can choose the material that he desires to weld.

In this example, differentiation is by mechanical properties or according to the specification.

The welding processes that can be used and the main difficulties expected during the welding of these grades are grouped together on one page.

By choosing the GMAW process, the user enters a three-dimensional structure which combines the grade, the choice of filler wire and the choice of shielding gas.

Whereas conventionally he would have had several documents each dealing with one of these themes, according to the method of the invention, there is the possibility of consulting all such information directly.

The conventional picture of the method of the invention is that of a tree structure, the final branches of which consist of the grades to be welded, the filler wires and the shielding gases.

To switch from one theme to another, it would be necessary to go back to the central node before going off down a new branch.

According to the invention, the use of hypertext links allows one to pass directly from one end of a tree structure to another.

Thus, to choose the consumables most suited for implementing a process for the GMAW welding of steels having a yield strength between 185 and 420 MPa, for example the consumable electrode wire to be used, the operator, after having selected the abovementioned type of welding process desired and the characteristics of the material to be welded, that is to say the elasticity range, will have the opportunity to refine his request by choosing one or more of the following options:

choice of a family of consumable wires or of shielding gases recommended for whatever steel in the yield strength range between 185 and 420 MPa, but for various types of welding process (GTAW, SAW, GMAW, etc.);

choice of settings of the welding parameters (current, voltage, feed rate, etc.) for a certain number of welding configurations likely to be encountered during the welding of a steel having a yield strength between 185 and 420 MPa, namely the thickness of the metal or metals to be welded and the configuration of the assembly to be produced.

By selecting one of these possible options, the user will then be presented with a solution to his problem, or with other options intended to further refine the search for the best solution to his problem.

For example, if the user wishes to know what family of consumable wires is recommended for whatever steel having a yield strength between 185 and 420 MPa and can be used for implementing a GMAW welding process, then he will be advised to use the family of E70S-x carbon steel wires, for example the NERTALIC™ 70A or 70S wires sold by La Soudure Autogéene Francaise, and will possibly be recommended to use, with these wires, a family of welding gases compatible with the welding to be carried out, such as the gases of the C1, M14, M21 or M23 families, for example the gases sold by L'Air Liquide S.A. under the brand names ARCAL™14, ARCAL™21, ARCAL™22, ATAL™5A, ELOXAL™35 or TERAL™23. Furthermore, by selecting one of these gases or gas mixtures, the user will then obtain details relating to this or these various gases. For example, if the user selects the gas called ARCAL™21, confirmation will then be given to him that this gas is indeed suitable for the GMAW welding of the abovementioned steels in combination with the aforementioned wire and that such a combination makes it possible to obtain, when implementing the welding process, good penetration, low smoke emission, a low degree of spatter of the molten metal droplets and little oxidation of the surface of the weld.

In addition, he will also be given the precise composition of the gas, namely a binary mixture of argon with 8% $CO_2$. Optionally, alternative gases could also be proposed to him.

He may also find out how to set the welding parameters for this family of steels and for the wire/gas pair which were mentioned above. For example, it would be proposed to him to weld at 90 cm/min, with a current of 360 A and a voltage of 29.5 V, for a feeder speed of a 1.2 mm diameter wire of 12.8 mm/s on an angled joint made of 10 mm thick plate.

Similarly, the user will also be able to obtain details relating to the welding wire. For example, by selecting the wire called NERTALIC™70S, he will be given, apart from the abovementioned information, the mechanical properties which will result from the combination of this wire with various gases or gas mixtures, or other similar information.

All of this information is displayed on a screen, for example a computer screen or a portable telephone screen, and may, if desired, be printed, stored or transferred to another person or to another computer, or may be subjected to further processing. The same type of architecture can be used to structure all the information relating to a given welding process, for example that of the choice of current source, that is to say the current generator, for the abovementioned GMAW process.

This is because it is often the case that a user is looking for precise information about this type of apparatus in order to generate the welding current.

Thus, according to the invention, the object-oriented decomposition and organization of the information allows him to find the information quickly without having to go through the complete and academic description of the welding generators usually found in the literature dedicated to this subject.

It is thus possible to build a structure which links the broad descriptive themes, such as the technology employed, the type of current delivered and its method of control, and the overall characteristics or, conversely, the specific features of the generators for each of the welding processes.

But it is possible, however, to devise finer relationships between sub-elements, for example the GMAW generators and the specific technologies implemented in this process.

This type of link makes it possible to discard any information which is superfluous or overly general for the user.

For example, the operator is firstly asked to choose the type of welding process envisaged: GMAW, GTAW, SAW or SMAW.

By choosing the GMAW process, he is then offered several options associated with this process, especially the current sources that can be used for the arc welding, the characteristics of the welding cycles, the characteristics of the current sources, the devices peripheral to these sources, such as transformers, rectifiers, etc.

As previously, by choosing, for example, the option of current sources that can be used for the arc welding, the user is then offered other choices intended to refine the search for the solution to his problem.

Moreover, the object-oriented segmentation of the technical information allows a structure to be created which makes it possible to solve, quickly and effectively, welding problems liable to arise before, during and after welding, cutting, etc.

Any difficulty or interrogation may be placed again in its context for the user, that is to say it becomes a situation.

Based on this, it is possible for him to choose among menus of complementary information which guide him gradually towards a corrective action, that is to say a solution to his technical problem.

Put another way, the method of the invention makes it possible to refine the diagnosis and to propose either a solution to the problem when this is a simple one, or to put forward hypotheses consisting of possible or conceivable solutions for solving his problem, on the basis of which the user would have to make several practical attempts before reaching the most suitable technical solution.

The corrective action stems from a tree structure of situations.

Once more, the object-oriented segmentation and the use of hypertext links make it possible within this action to recall which may be the secondary consequences thereof via a link to other problematic situations which could result from solving the first problem.

In welding, the modification of one parameter generally induces variations in several observables.

For example, in the case of a question posed by a practitioner during the preparation of his welding equipment, such as the choice of wire feeder drive rolls in the GMAW or submerged-arc process, the user will find his reply through an "equipment setting" problem menu, will choose the desired process and then the "choice of feeder drive rolls" line in the menu presented.

If the question is posed during welding, the practitioner will have the choice between the various welding processes and will then have to select his problem from within the list presented, for example arc instabilities in the case of problems associated with the GMAW process. He is then presented with a list of solutions such as to clean the nozzle of the welding torch.

In the case of a problem detected after welding, for example a problem associated with the presence of porosity in the weld beads, the user may enter the "porosity" term directly in an internal search engine.

He is then firstly asked to give the type of material to be welded, such as aluminium, steel, nickel base, etc., and then to indicate the process used, GMAW, submerged-arc, etc.

These details make it possible to refine the way the problem is posed, while indicating what the influencing factors are.

At this stage, the user is faced with three possible porosity sources, namely $CO/CO_2$, hydrogen or nitrogen super saturation.

He must then make a first choice, on the basis of which explanations relating to the process causing his problem, followed by the corrective action or actions to be applied, are given.

Thus, if the possible cause is nitrogen, it will be suggested that he reduce the arc instabilities, reduce its terminal part, reduce the welding voltage or else check the quality of the gas shield.

These corrective actions may also warn the user about the impact that they might have on other phenomena.

By means of hypertext links, it is possible, as in the case of modification of the welding current in the example mentioned, to remind the user that this will also have repercussions on the shape of the weld beads.

The user must then understand that he must make a compromise between the various situations listed.

Without the possibility of linking these situations to a given action, as is the case in the current systems, the user may solve one problem but create another one without prior warning.

However, if the problem posed is simpler to solve, such as for example that of the existence of undercuts at the border of the welded joint, the corrective actions will be suggested directly without passing through a hypotheses step, that is to say only necessary and known information from the user is required.

It goes without saying that, to be able to solve his problem by means of the present invention, the practitioner must provide as much detail as possible as regards the welding process used, in order to be able to avail himself of the corrective actions to be implemented.

Links may also be created between the objects and the situations or the corrective or informative actions.

If the user is looking for the welding parameters for a given grade and a defined welding configuration, it is possible, in addition to answering this precise question, to make a hypertext link to possible resources for this action.

For example, the recommended welding consumables may be linked to this welding procedure.

Since a hypertext link can operate in both directions, the tool may, in a product selection guide module, provide a direct link with the welding procedure appropriate to the chosen configuration.

Breaking down the technical welding knowledge into elementary modules linked by hypertext links then makes it possible to introduce an element of knowledge each time the user might search for information on his subject. It is therefore no longer a question of successive referrals from chapter to chapter in one or more reference works or of returning to the initial node of the tree structure in order to reach it along another direction.

For example, a user seeking to increase his productivity could be forced to consult information in reference works relating to welding or cutting processes, to technical documentation about the consumables or to books on optimized welding procedures.

The use of hypertext links allows the tool to offer a direct link between all this information. After having chosen the process, three choices are presented to the user, namely improvement of the welding parameters, choice of the products or use of particularly productive processes.

By choosing, preferably by clicking, with the aid of a mouse controlling a cursor moving on the screen of the user station, on the improvement of the selection of consumables, the user will avail himself of information such as the rates of deposition with certain filler wires or gases even though he is not in a specific product selection menu.

Likewise, the solutions with regard to health and safety bring together problems relating to noise, smoke, heat, electrical risks, evolution of toxic gases or handling of gas bottles.

These various headings are generally dealt with in various reference works on electricity, welding consumables or heat.

In a metal workshop, the user will therefore have access to all this data and to the recommendations applicable to subjects as diverse as consumables, ventilation, setting of welding parameters in order to reduce smoke emission, etc.

The architecture of the invention, as detailed above, makes it possible to solve problems or to answer questions common to many activity sectors associated with welding.

Transverse links whose origin is the type of market or the type of construction are also constructed.

Segmentation of the dockyard, pressure vessel, pipelaying, engineering construction, etc. type is also the basis of navigation within the tool in which the links would be constructed around the preoccupation of each of these activity sectors.

For example, the submerged-arc process would have little chance of being used in a maintenance shop.

On the other hand, portable solutions, such as current generators based on the technique of inverters, and therefore of low weight and volume, would be associated with the maintenance sector.

In short, the invention is based on:

- a segmentation of the knowledge relating to welding, cutting or the like by elements of knowledge, which may be classified as elementary objects, for example a welding tool or part of such a tool, products or a family of products, a situation describing a problem or an interrogation, and corrective actions. The expression "element of knowledge" is understood to mean any subject, attribute, complement, elementary situation or corrective action which constitutes an object or an element making sense for a welding practitioner. It is the sum of phrases containing these elements which is described as a document;
- a technical knowledge structure for welding, constructed on the basis of questions that practitioners might pose;
- the use of hypertext links which make it possible to link, as many times as necessary, an object, situation or action to another element of knowledge. This makes information quickly accessible and stripped of any superfluous environment for the person seeking an answer to a precise question. These links are established according to the rules of the art and must be discriminating;
- an overall architecture which corresponds to a welding operation: preparation, action, controls and improvements. A crossed structure which allows a user of a given market sector to find information filtered out from among the previous structure and dedicated to one type of application;
- a search engine which allows direct entry at any point in the system;
- the use of HTML-type computing formats which make it possible to consult the tool using most types of computing units, such as micro-computers, workstations, terminals, etc. equipped with operating systems such as Windows™, Unix™, Linux™, etc.

BRIEF DESCRIPTION OF THE DRAWINGS

The method and the system of the invention are shown schematically in the appended figures.

DESCRIPTION OF THE PREFERRED EMBODIMENTS

Figure 1:
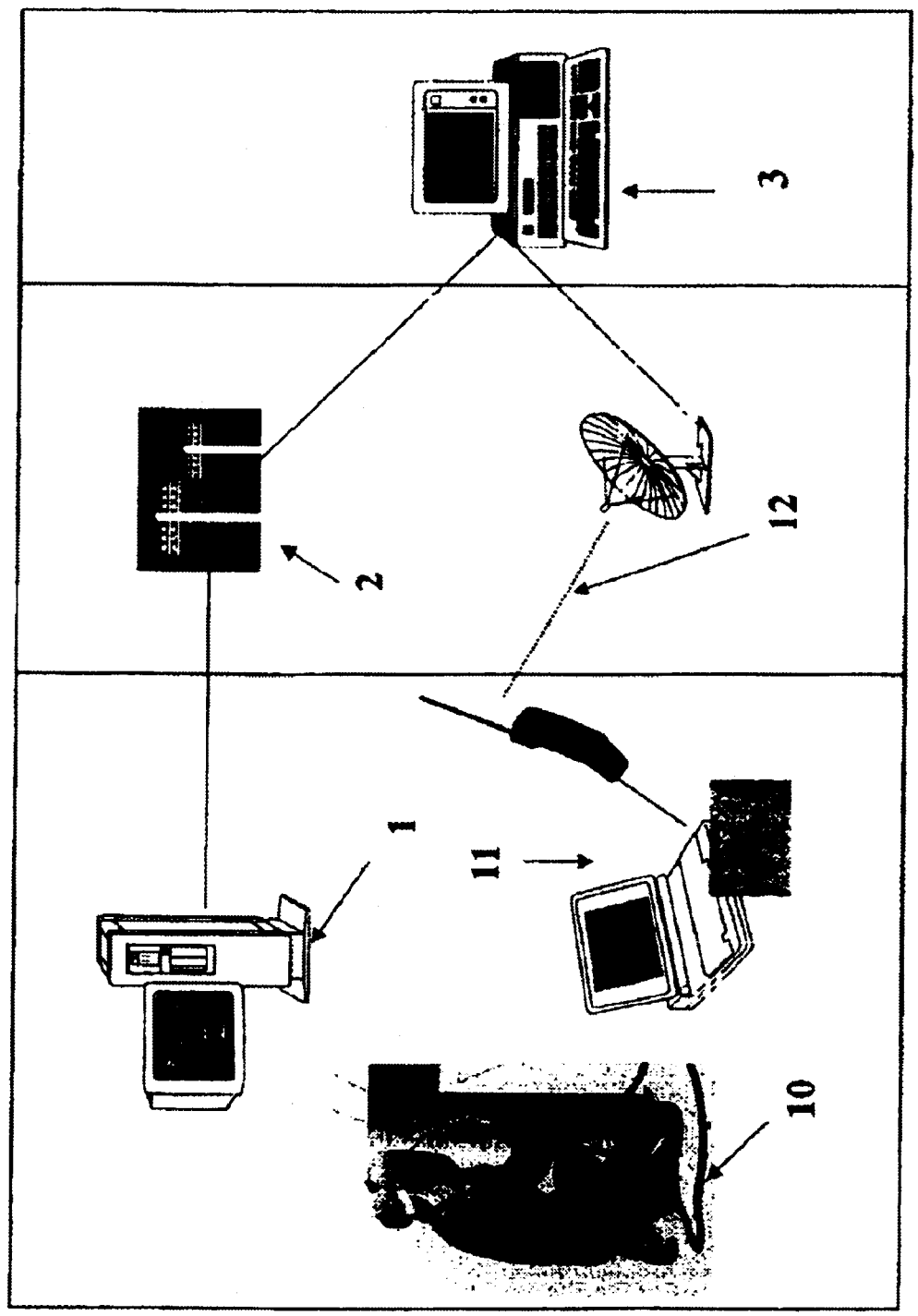
FIG. 1 shows a system overview.

FIG. 1 thus shows an operator 10 who has encountered a problem during implementation of a welding or similar operation, for example a weld bead of poor quality or mediocre appearance.

To solve his problem quickly, that is to say in such a way that the productivity of the welding process is not affected, or is affected as little as possible, the operator 10 can obtain an almost immediate solution to this problem in real time by virtue of the method of the invention, and by proceeding as follows.

Firstly, the operator indicates or selects the type of heat treatment process employed, for example a gas-shielded arc welding process, and indicates or selects, on the one hand, the type of technical problem that he has encountered and, on the other hand, one or more parameters relating to the configuration of the said welding process. If necessary, further technical information may be provided.

These indications and/or selections may be made by means of a fixed or portable computer 1 or a telephone 11 provided with suitable acquisition means, such as a keyboard, a mouse or the like.

The information from the operator is then transmitted, for example by a wire link 2 and/or a radio link 12, to a data processing server 3 which makes it possible to process this information and which, after this processing, presents the user with one or more technical solutions to be applied so that his welding process is modified effectively, that is to say presents him with one or more items of corrective information, modifications or adjustments to be made to one or more configuration parameters of said heat treatment process so as to try to solve the technical problem encountered.

This corrective information will be retransmitted to the operator via the aforementioned data transmission means.

The operator has merely to modify his welding process, taking into account this corrective information, and thus eliminates the technical problem with which he was confronted.

Depending on the case, it will also be possible to use the method of the invention to give a welding practitioner the means of informing himself about a technique or a welding process with which he is not very familiar, to organize the welding-related knowledge so that it answers technical questions and interrogations or solves technical problems, and/or to illustrate these remarks with quantitative or teaching examples.

More generally, the invention also relates to an information processing system intended to make it easier to obtain an answer to a question or a solution to a problem which might arise during a heat treatment operation.

Using a menu displayed on a computer screen, pocket organizer, portable telephone, watch, etc., it is possible to activate a link, for example a hypertext link in a WEB page, to a database by means of the processor in this tool and the programs contained in its memory.

This activation of one of the elements of a menu may also be accomplished, for example, by means of a mouse, a pointer on a touchscreen, a voice recognition system, etc.

This link makes it possible to activate, through a wire or radio network, an information storage and processing tool.

In this tool, the information is contained in files, for example, stored in memory on a hard disk, and operates using an executable installed on an information system, such as a computer, by means of elements such as a hard disk, a micro-processor and the random-access memory and other elements needed for any computer or information processing system to operate correctly.

This executable, thanks to the processor, will search for the requested information in a database, for example the Access™ program from Microsoft™, of the hard disk, extract it or possible store it momentarily in the random-access memory, and then to send it back, via the same means as that for the request, to the user.

The latter will then be able to display the reply on a screen on a portable or fixed computer, a mobile telephone, a pocket organizer or a watch, again with the aid of executables stored in the memory of the user station and operating by means of a programmed chip or processor.

Figure 2:
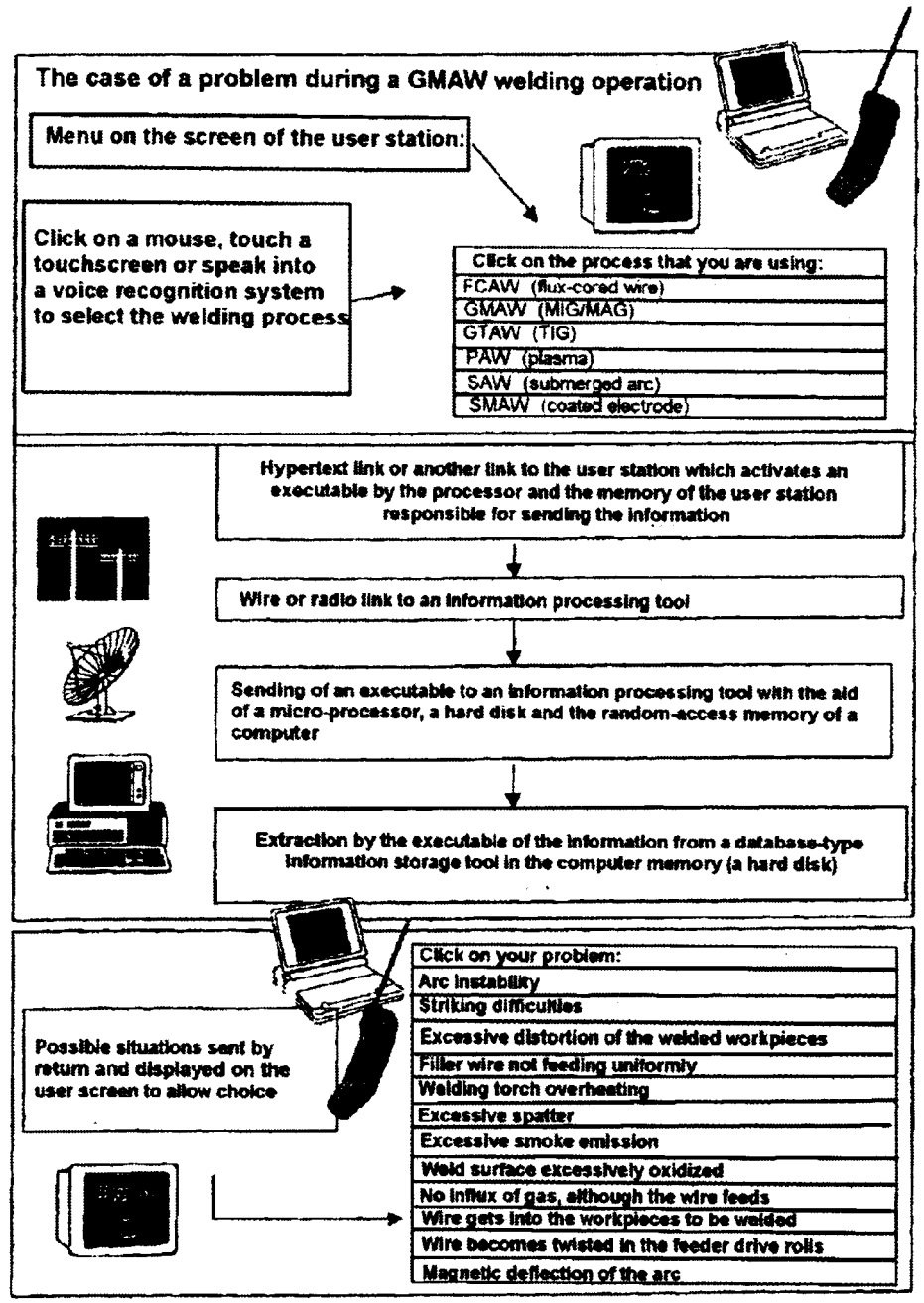
FIG. 2 shows a welding operation example.

FIG. 2 illustrates, moreover, the case of a problem arising during a GMAW welding operation, for example a problem with the feeding of the wire, although the wire feeder is operating correctly.

The user, that is to say the welder, his foreman or the welding engineer, will start up the tool, using the method of the invention, on his portable computer, mobile telephone or pocket organizer.

To do this, he will activate an executable programme using a mouse, a touchscreen or the like, which will send the command to the machine to start searching for one or more items of information in a central server via at least one wire or radio link.

The executable in the server will then load the "welding" home page, which is transmitted to the user via the same means as previously.

By clicking on the "incidents and remedies" hypertext link, the executable in the server station is again activated.

This time, the hypertext link will make a database management executable fetch the desired information from the database(s) identified by the program and stored on the hard disk of the server or on another mobile storage means (CD-ROM, ZIP disk, etc.).

The process of exchanging information between the user station and the server is similar to the previous one.

Through the successive choices (clicks) associated with the choice of the process, and with the description of its "feed problem" consumable wire incident, a list of corrective actions will be presented to the user, all this information being stored in a database on the hard disk or on a mobile storage medium such as a CD-ROM.

Thus, given the rate of information exchanged by this mode of communication, the user will have had the solution to his problem very quickly and without leaving his workplace, whereas the conventional approach would have been either to find the person who could solve the problem, who is not necessarily available or present on the site, or to look for the solution to his problem in the technical reference works relating to welding, but with the risk of not finding a suitable solution or of finding an incomplete solution therein, and/or with the risk of wasting a great deal of time.

In other words, the solution to the problem that has arisen could, in no case, be found as quickly. The system of the invention, consisting of a database, server stations and users provided with processors, in-memory executable programs, databases and data processing tools, together with wire or radio links, makes it possible to solve a problem that has arisen during a heat treatment operation very quickly and on site.

In the case of this example, resolution of the problem would pass, for example, through the following proposed solutions that the system of the invention would present to the operator almost instantly, namely:

check if the proper type of wire feeder is used;
check the surface state of the wire;
clean the nozzle of the torch;
reduce the pressure of the brake on the wire spool;
check that the wire surface is not excessively oxidized;
check that the spool of wire is still properly spooled;
adjust the pressure of the feeder drive rolls;
check that the welding torch cables are not overly twisted;
use a push-pull system.

It will be immediately understood that the method and the system according to the invention result in an appreciable gain in efficiency, when a welding process or the like is carried out by an operator, compared with the prior art.

What is claimed is:

1. A welding assistance method for a user to exploit information available at a remote computer welding database in a contemplated welding operation, comprising the steps of:
the user supplying an information request to the database, the information request comprising
(a) a first indication and/or selection by the user of a type of contemplated heat treatment process,
(b) a second indication and/or selection by the user of at least one type of technical problem to be solved arising or likely to arise during implementation of the contemplated heat treatment process, and
(c) a third indication and/or selection by the user of at least one parameter relating to a configuration of the contemplated heat treatment process;
the database processing of at least some of the first, second, and third indications or selections made by the user;
after the processing step, the database supplying information relating to the contemplated heat treatment process as a proposal to the user of at least some information relating to at least one modification or at least one adjustment to be made to at least one configuration parameter of the contemplated heat treatment process so as to solve, at least partly, the type of technical problem supplied by the user in the second indication; and
the user receiving the information in the proposal and combining that information with user experience and user information to perform a welding operation of the contemplated heat treatment process by setting, modifying, or adjusting at least one parameter of the welding operation based on the information in the proposal.

2. Method according to claim 1, wherein, the type of contemplated heat treatment process is from the group formed by cutting processes, welding processes, marking processes, heat spraying processes and combinations thereof.

3. Method according to claim 1, wherein, the indication or the selection is made by the user via interactive computer means.

4. Method according to claim 1, wherein, the indications are taken from selections shown on a computer display and user input is made on a touchscreen.

5. Method according to claim 1, wherein, the second indication concerns a choice of consumables.

6. Method according to claim 1, wherein, the indications or selections made by the user comprises:
(i) a comparison of the indications or selections with reference information stored in at least one database or databank, and (ii) a proposal of at least one solution, of an explanation and/or of an answer to a question raised, the solution, explanation and/or answer being stored in at least one database or databank.

7. Method according to claim 1, wherein, the proposal is sent to a display screen allowing at least one of the welding parameters to be displayed.

8. Method, utilizing a remote welding computer database, for determining, setting, adjusting and/or modifying at least one parameter of a heat treatment process, comprising the steps of:

prior to beginning any heat treatment process, the user making a query to the database in the form of a first indication and/or selection by the user of a type of heat treatment process to be implemented, and a second indication and/or selection by the user of at least one parameter relating to the configuration of the heat treatment process, that has to be or is likely to be adjusted, modified or set, before or during implementation of the heat treatment process of the first indication;

the database processing of at least some of the first and second indications or selections made by the user;

the computer providing a proposal to the user of at least some information relating to at least one modification or at least one setting to be made of at least the configuration parameter of the heat treatment process.

9. Method according to claim 8, characterized in that it includes at least one additional step:

of displaying, storing, printing, transmitting, interpreting and/or exporting at least some information obtained from the database; and of modifying or setting at least one configuration parameter of the heat treatment process according to at least some information obtained from the proposal.

10. Method according to claim 8, wherein, the second indication is at least one configuration parameter of the heat treatment process and is chosen from the voltage, the current, the feed rate of the filler wire, the speed of advance or welding speed, the nature of the filler wire or electrode, the nature of the shielding gas, its flow rate and/or its quality, the choice of solid flux associated with the wire in submerged-arc welding, the orientation and position of the welding torch with respect to the weld to be produced, the preparation and the thickness of the workpieces to be joined together or, in the case of cutting, the cutting speed and/or the gas used.

11. A welding assistance system for assisting a user in implementation of a heat treatment process, comprising:

an information query tool allowing a user to form a technical problem query concerning a type of heat treatment process implemented or to be implemented, at least one type of technical problem to be solved that has arisen or is likely to arise during implementation of the type of beat treatment process, and at least one parameter, preferably several parameters, relating to the configuration of the heat treatment process;

a welding computer comprising a welding database operatively connected to the information query tool to receive the user query and for processing the user query by interaction with the welding database to obtain a responsive information to the user query; and an information delivery means for displaying, storing, printing, transmitting, interpreting and/or exporting the responsive information comprising at least one piece of information relating to at least one modification and/or at least one setting to be made of at least one configuration parameter of the heat treatment process so as to solve, at least partly, the technical problem.

12. System according to claim 11, wherein, the user query tool comprises a user station comprising
a central processing unit coupled to a network card or a modem; and
a screen allowing information to be displayed; and
a data entry keyboard, a mouse, a touchscreen and/or a voice recognition system, the user station interacting remotely via a network with the welding computer and the welding database.

13. System according to claim 11, wherein, the user query tool interacts with the welding computer via the Internet.

14. System according to claim 11, wherein, the user query tool comprises data transmission of a network to the welding computer.

* * * * *